US009829376B2

(12) United States Patent
Chiou

(10) Patent No.: US 9,829,376 B2
(45) Date of Patent: Nov. 28, 2017

(54) SKY LUMINANCE MAPPING SYSTEM AND MAPPING METHOD

(71) Applicant: National Taiwan University of Science and Technology, Taipei (TW)

(72) Inventor: Yun-Shang Chiou, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 251 days.

(21) Appl. No.: 14/831,859

(22) Filed: Aug. 20, 2015

(65) Prior Publication Data

US 2016/0269630 A1 Sep. 15, 2016

(30) Foreign Application Priority Data

Mar. 9, 2015 (TW) .............................. 104107462 A

(51) Int. Cl.
*H04N 7/00* (2011.01)
*G01J 1/42* (2006.01)
*G01J 1/02* (2006.01)
*G01J 1/04* (2006.01)

(52) U.S. Cl.
CPC .......... *G01J 1/4214* (2013.01); *G01J 1/0242* (2013.01); *G01J 1/0418* (2013.01); *G01J 1/0437* (2013.01); *G01J 2001/4266* (2013.01)

(58) Field of Classification Search
None
See application file for complete search history.

(56) References Cited

U.S. PATENT DOCUMENTS 3,934,259 A 1/1976 Krider
2014/0327769 A1 11/2014 Hamann et al.

FOREIGN PATENT DOCUMENTS

CN 1482142 3/2004
TW 200951878 12/2009

OTHER PUBLICATIONS

Chiou et al., "The Ever Changing Sky-BIM Model in Daylighting Study", 2014 ASHRAE/IBPSA-USA, Building Simulation Conference, Atlanta GA, Sep. 10-12, 2014, pp. 1-8.
Chiou et al., "An HDRi-based data acquisition system for the exterior luminous environment in the daylight simulation model", Solar Energy 111, Jan. 2015, pp. 104-117.
"Office Action of Taiwan Counterpart Application", dated Feb. 2, 2016, p. 1-p. 3.

*Primary Examiner* — James M Anderson, II
(74) *Attorney, Agent, or Firm* — JCIPRNET

(57) ABSTRACT

A sky luminance mapping system includes a camera unit, two pyranometer units and a processing unit. Camera unit includes a fisheye lens to shoot image of sky dome and is equipped with light-shading devices which block the sun from the camera unit corresponding to instant location of the sun at instant time. First pyranometer unit measures daylight illuminance from the sky dome and outputs first intensity signal while the light-shading device is applied to block the sun. Second pyranometer unit measures daylight illuminance from the sky dome and outputs second intensity signal without blocking the sun. A reference intensity value is obtained by subtracting a value of the first intensity signal from a value of the second intensity signal. According to the value of the first intensity signal and the reference intensity value, a total luminance of and the luminance distribution in the image of the sky dome are corrected.

12 Claims, 7 Drawing Sheets

SKY LUMINANCE MAPPING SYSTEM AND MAPPING METHOD

CROSS-REFERENCE TO RELATED APPLICATION

This application claims the priority benefit of Taiwan application serial no. 104107462, filed on Mar. 9, 2015. The entirety of the above-mentioned patent application is hereby incorporated by reference herein and made a part of this specification.

FIELD OF THE INVENTION

The invention relates to a sky luminance mapping technique that can be applied to instantly shoot an image of a sky dome in the daylight.

DESCRIPTION OF RELATED ART

Observation of images of the sky dome is sometimes deemed necessary. For instance, in case of weather observation, clouds in the sky need be monitored for a long period of time. However, the sun shows up in the daylight sky. The luminance of the sun is much greater than the background luminance of the environment, and thus the direct sun light may hinder the observers from observing the actual background environment around the sun.

According to the related art, several photo-shooting techniques may be applied to shoot images of the sky dome. For instance, a high dynamic range imaging (HDRi)-based sky luminance mapping technology may be applied to document the luminance distribution of the entire sky dome by shooting images of the sky dome at different exposure levels via exposure bracketing within one minute, cutting down the images into 145 CIE sky patches or other demanding number, and extracting the luminance of each of the 145 CIE sky patches.

FIG. 1 illustrates a basic mechanism of shooting images of the sky dome according to the related art. With reference to FIG. 1, a camera 100 on the ground is employed to shoot images of the sky dome 102. The sun 104 is in the sky dome 102 in the daylight. FIG. 2 schematically illustrates structures of sky patches captured by applying HDRi. With reference to FIG. 2, the sky dome 102 may be represented by projecting onto an image of a circular plane. The image is divided into different rings with different widths, and each of the rings is further divided into plural patches 106 based on actual demands.

In most cases, the conventional HDRi technology cannot be applied under direct sun light exposure for a long time. Specifically, the luminance of the direct sun light as a point light source often exceeds the total background luminance, and the direct sun light may overheat the photo sensor in the camera while the exposure level is adjusted according to the background luminance. In another aspect, the reliance of a filter for reducing the luminance of the direct sun light entering the photo sensor may lead to the interference of baseband noises with other signals and the resultant distortion of the signals. Besides, the filter need be manually replaced, which results in significant costs and time and reducing the expecting advantage of fast mapping.

SUMMARY OF THE INVENTION

The invention is directed to a sky luminance mapping technique that can be applied to instantly shoot an image of a sky dome in the daylight and acquire the luminance of the sky dome.

In an embodiment of the invention, a sky luminance mapping system that includes a camera unit, a first pyranometer unit, a second pyranometer unit, and a processing unit is provided. The camera unit includes a first support mechanism, a digital camera arranged on the first support mechanism, and a first light-shading device arranged on the first support mechanism. The digital camera has a fisheye lens to shoot an image of a sky dome, and a location of the first light-shading device corresponds to an instant location of a sun at an instant time, such that the first light-shading device blocks the sun from the digital camera. The first pyranometer unit includes a second support mechanism, a first pyranometer arranged on the second support mechanism, and a second light-shading device arranged on the second support mechanism. The first pyranometer measures the daylight illuminance from the sun-blocked sky dome to output a first intensity signal. A structure of the second light-shading device is the same as a structure of the first light-shading device, and a location of the second light-shading device corresponds to the instant location of the sun at the instant time, such that the second light-shading device blocks the sun from the first pyranometer. Here, the second support mechanism and the second light-shading device corresponding to the first support mechanism and the first light-shading device are separately arranged, or the second support mechanism and the second light-shading device can be common devices used as the first support mechanism and the first light-shading device. The second pyranometer unit includes a third support mechanism, a second pyranometer arranged on the third support mechanism. The second pyranometer measures the daylight illuminance from the complete sky dome to output a second intensity signal while the sun is not being blocked. The processing unit receives the first intensity signal output by the first pyranometer, the second intensity signal output by the second pyranometer, and the image of the sky dome shot by the digital camera. Here, a reference intensity value is obtained by subtracting a value of the first intensity signal from a value of the second intensity signal, and the luminance distribution in the image of the sky dome is corrected according to the value of the first intensity signal and the reference intensity value.

In an embodiment of the invention, a sky luminance mapping method includes following steps. An image of a sky dome is shot by a digital camera, wherein a first light-shading device with respect to an instant location of a sun at an instant time is configured to block the sun from the digital camera. The daylight illuminance from the sun-blocked sky dome is measured by a first pyranometer unit to output a first intensity signal, wherein a structure of a second light-shading device is the same as a structure of the first light-shading device, a location of the second light-shading device corresponds to the instant location of the sun at the instant time, and the second light-shading device blocks the sun from a first pyranometer. Here, a second support mechanism and the second light-shading device corresponding to a first support mechanism and the first light-shading device are separately arranged, or the second support mechanism and the second light-shading device can be common devices used as the first support mechanism and the first light-shading device. The daylight illuminance from the complete sky dome is measured by a second pyranometer unit to output a second intensity signal while the sun is not being blocked. A value of the first intensity signal is subtracted from a value of the second intensity signal by a processing unit to obtain a reference intensity value, and the total luminance of and the luminance distribution in the image of the sky dome are corrected according to the value of the first intensity signal and the reference intensity value.

According to an embodiment of the invention, in the sky luminance mapping system or method, the first light-shading device and the second light-shading device are light-shading rings, and a ring surface of each of the light-shading rings corresponds to a trajectory plane of the sun, so as to block the sun from the digital camera and the first pyranometer.

According to an embodiment of the invention, in the sky luminance mapping system or method, the total luminance of and the luminance distribution in the image of the sky dome are corrected according to the first intensity signal and the reference intensity value by adding the luminance of a direct sun light derived from the reference intensity value to a total luminance used for adjusting the image according to the first intensity signal.

According to an embodiment of the invention, in the sky luminance mapping system or method, the first light-shading device and the second light-shading device are light-shading sheets, and an area shaded by the light-shading sheets is moved together with time by a control mechanism according to a trajectory of the sun.

According to an embodiment of the invention, in the sky luminance mapping system or method, the digital camera is a high dynamic range imaging (HDRi) camera.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In an embodiment of the invention, a sky luminance mapping system and a sky luminance mapping method are provided. Specifically, through the overall arrangement of pyranometers and light-shading devices (e.g., light-shading rings or light-shading sheets), sun light and sky light can be respectively measured. During the measurement, components in the sky luminance mapping system are not replaced manually because of the HDRi technology, and thereby both cost and labor can be saved. Experimental tests have been run on the system and the method provided herein, and the influence of direct sunlight has been carefully avoided in all experiments. In addition, the system can provide fast updating rate of the exterior luminous environment and can be operated outdoor continuously for several hours.

According to an embodiment of the invention, the sky light can be timely detected, such that the sky light information can be instantly provided while particular attention is given to the daylighting design of buildings. Said sky light information can also be applied to automatically control the way to utilize daylight. Several embodiments are provided below to describe the invention; however, the invention should not be limited to the embodiments given herein.

Figure 1:
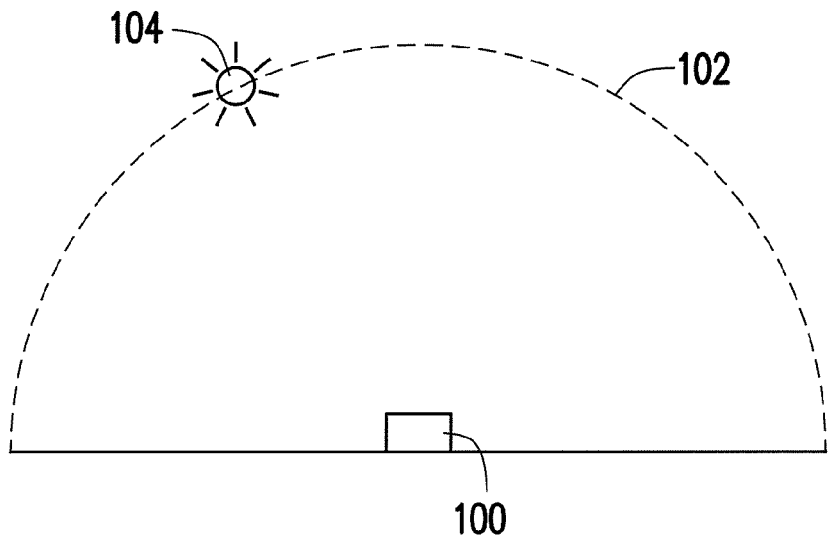
FIG. 1 illustrates a basic mechanism of shooting images of a sky dome according to the related art.
Figure 2:
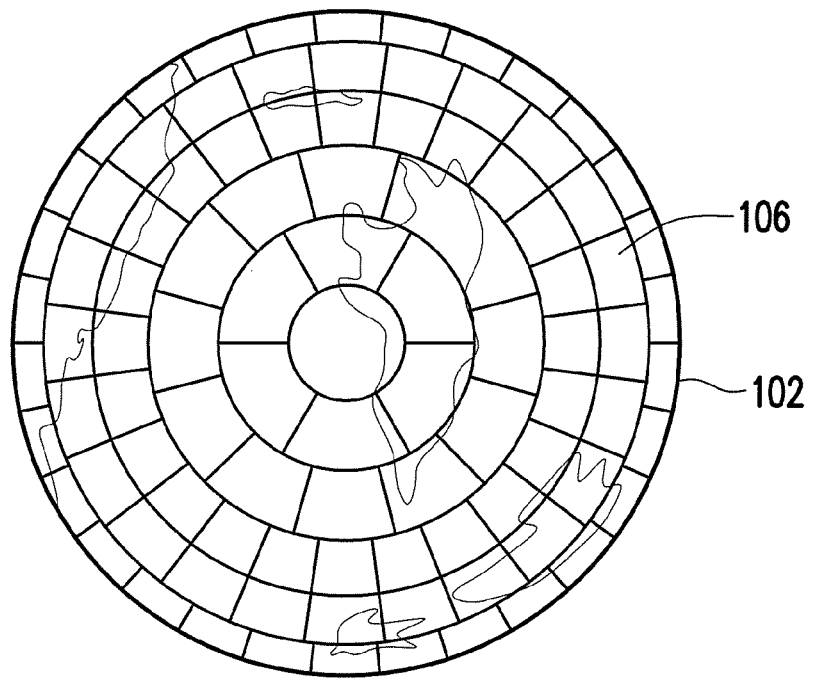
FIG. 2 schematically illustrates structures of sky patches captured by applying HDRi.
Figures 3A, 3B:
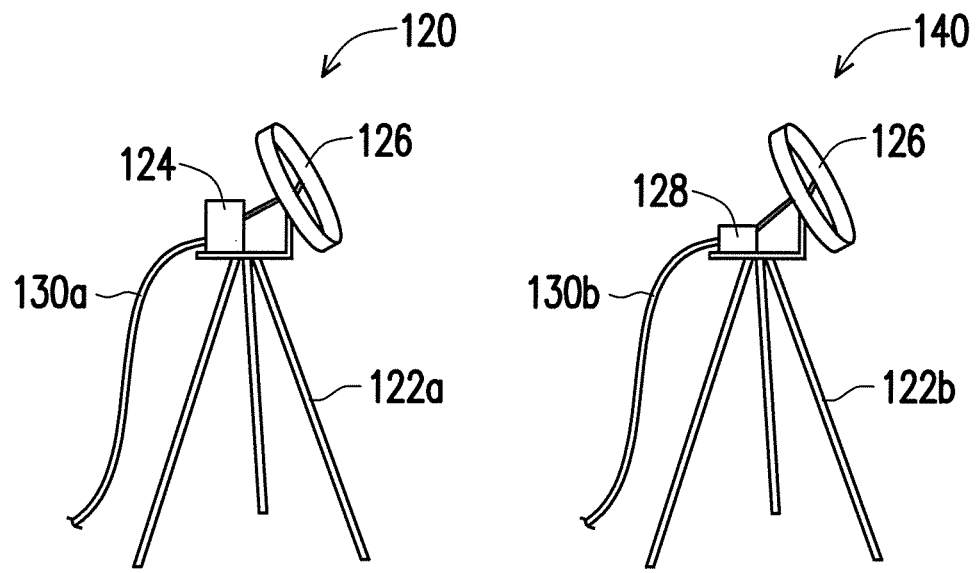
FIG. 3A-FIG. 3C schematically illustrate a sky luminance mapping system according to an embodiment of the invention.
Figure 3C:
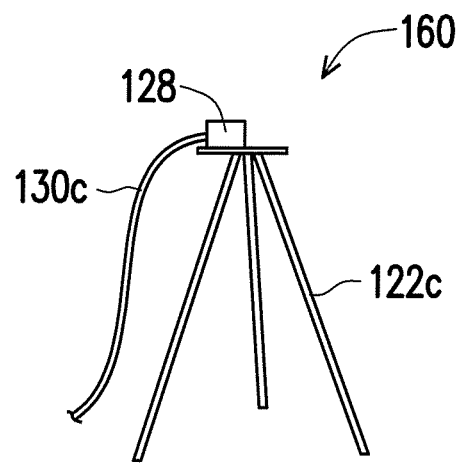

FIG. 3A-FIG. 3C schematically illustrate a sky luminance mapping system according to an embodiment of the invention. With reference to FIG. 3A, in the present embodiment, a sky luminance mapping system includes a camera unit 120, a first pyranometer unit 140, and a second pyranometer unit 160. The structure of the camera unit 120 includes a support mechanism 122a, a digital camera 124, and a light-shading device 126, for instance. The digital camera 124 is arranged on the support mechanism 122a; besides, the digital camera 124 has a fisheye lens to shoot an image of the sky dome. The image of the sky dome may be taken according to the HDRi mechanism or in any other conventional or developing imaging manner. The image of the sky dome shot by the digital camera 124 is transmitted to a post processing unit; for instance, the data may be output via a signal cable 130a or in a wireless manner, which should not be construed as a limitation to the invention. The post processing unit is a computer system or any other similar equipment, for instance.

During the daytime, unless the sun is blocked by clouds, the luminance of the direct sun light is far greater than the luminance of the sky light. In order to relieve the influence of the direct sun light on the image shooting, the light-shading device 126 is adopted. The light-shading device 126 is arranged on the support mechanism 122a. Relative directions of the digital camera and the sun may be geometrically changed together with time. The location of the light-shading device 126 corresponds to the instant location of the sun at an instant time, such that the light-shading device 126 blocks the sun from the digital camera 124. The trajectory of the sun on the sky can be obtained and is shaped as an arc. In the present embodiment, the light-shading device 126 may have a structure of a light-shading ring, for instance. The ring body corresponds to the trajectory of the sun, so as to block the direct sun light from the digital camera 124; thereby, the influence of the direct sun light on the digital camera 124 can be relieved, and the digital camera 124 can thus capture the luminance distribution of the sky. Nevertheless, during the image shooting process, the luminance of the direct sun light is not taken into account; hence, although the image of the detailed structure of the sky dome can be captured, the total luminance is different from that of the actual sky dome. The image shot by the digital camera 124 thus requires correction.

In order to correct the luminance, the first pyranometer unit 140 and the second pyranometer unit 160 are provided herein. With reference to FIG. 3B, the first pyranometer unit 140 includes a support mechanism 122b, a pyranometer 128, and the light-shading device 126. The pyranometer 128 is arranged on the support mechanism 122b as well and is able to measure the daylight illuminance from the sun-blocked sky dome and output a first intensity signal. During the measurement of the first intensity signal, the light-shading device 126 arranged on the support mechanism 122b is simultaneously employed. The structure of the light-shading device 126 shown in FIG. 3B is the same as the structure of the light-shading device 126 shown in FIG. 3A, and the location of the light-shading device 126 shown in FIG. 3B also corresponds to the instant location of the sun at the instant time, such that the light-shading device 126 blocks the sun from the pyranometer 128. The signal generated by the pyranometer 128 is output to the post processing unit via a signal cable 130b, for instance. Since the relative arrangement of the light-shading device 126 and the pyranometer 128 is the same as the relative arrangement of the light-shading device 126 and the digital camera 124, the environmental conditions of the pyranometer 128 correspond to the environmental conditions on which the digital camera 126 shoots the image of the sky dome.

In the present embodiment, the support mechanism 122b and the light-shading device 126 shown in FIG. 3B corresponding to the support mechanism 122a and the light-shading device 126 shown in FIG. 3A are separately arranged. However, given that the arrangement of the light-shading device 126 remains unchanged, the digital camera 124 and the pyranometer 128 may be arranged on the same support mechanism according to another embodiment of the invention. That is, the support mechanism 122a and the second light-shading device 126 arranged thereon can be common devices used as the support mechanism 122b and light-shading device 126 thereon. As such, the structures shown in FIG. 3A and FIG. 3B can be integrated to form one unit.

With reference to FIG. 3C, the second pyranometer unit 160 includes a support mechanism 122c and a pyranometer 128. The pyranometer 128 is arranged on the support mechanism 122c. The pyranometer 128 shown in FIG. 3C is the same as the pyranometer 128 shown in FIG. 3B; however, the pyranometer 128 shown in FIG. 3C measures the daylight illuminance from the complete sky dome to output a second intensity signal while the sun is not being blocked. The second intensity signal generated by the pyranometer 128 is also output to the post processing unit via a signal cable 130c, for instance.

The post processing unit receives the first intensity signal output by the first one of pyranometer 128, the second intensity signal output by the second one of pyranometer 128, and the image of the sky dome shot by the digital camera 124. The processing unit processes the image of the sky dome by applying the HDRi technology; as to the correction of the total luminance of and the luminance distribution in the image, a reference intensity value is obtained by subtracting a value of the first intensity signal generated by the pyranometer 128 shown in FIG. 3B from a value of the second intensity signal generated by the pyranometer 128 shown in FIG. 3C. The first intensity signal indicates the physical quantity obtained by subtracting the daylight illuminance from the portion of the sky dome blocked by the shading device 126 from total daylight illuminance. The second intensity signal indicates the physical quantity of the total daylight illuminance from the sky dome. Hence, the reference intensity value is the daylight illuminance from the shaded portion of the sky dome, including the daylight illuminance contributed by the sun. Since the image is shot by the digital camera 124 without the direct sun light exposure, the luminance of the image of the sky dome is corrected according to the reference intensity value. That is, the actual luminance of the sky light can be estimated in a relatively accurate manner if the luminance effect of the direct sun light is added to the luminance of the image of the sky dome.

Figure 4A:
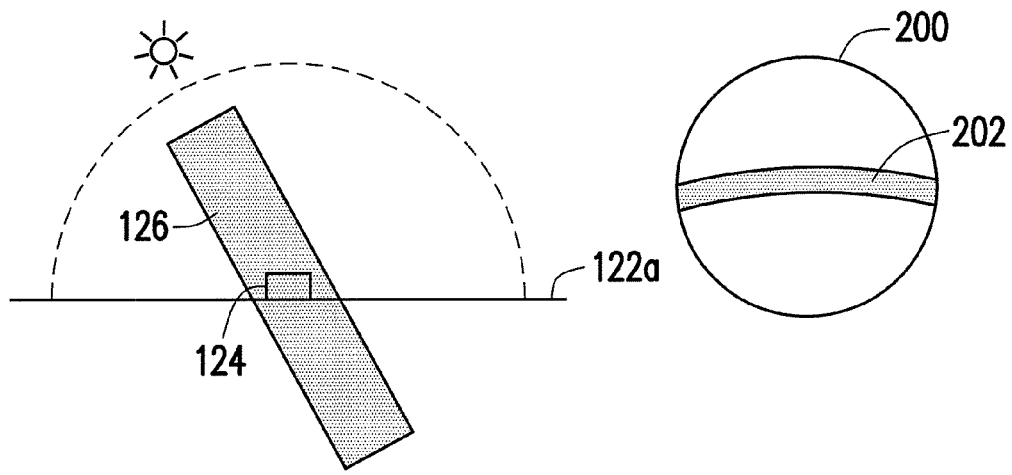
FIG. 4A-FIG. 4C schematically illustrate environmental conditions corresponding to FIG. 3 according to an embodiment of the invention.

An area shaded by the light-shading ring (or the light-shading device), i.e., the shadow area 202 shown in FIG. 4A, is exposed to the direct sun light. The other part of the sky dome is not exposed to the direct sun light. The correction is done separately, for instance. In an embodiment of the invention, the camera unit 120 derives the initial sky luminance distribution of the other part of the sky dome not exposed to the direct sun light and the absolute scale of the total luminance of the image of the sky dome is corrected from the daylight illuminance measured by the first pyranometer unit 140. The daylight illuminance from the area exposed to the direct sun light is the reference intensity value obtained by subtracting the value of the first intensity signal measured by the first pyranometer 140 from the value of the second intensity signal measured by the second pyranometer unit 160, and the luminance of the area exposed to the direct sun light is then corrected according to the corrected sky luminance distribution of the other part of the sky dome not exposed to the direct sun light.

Figure 4B:
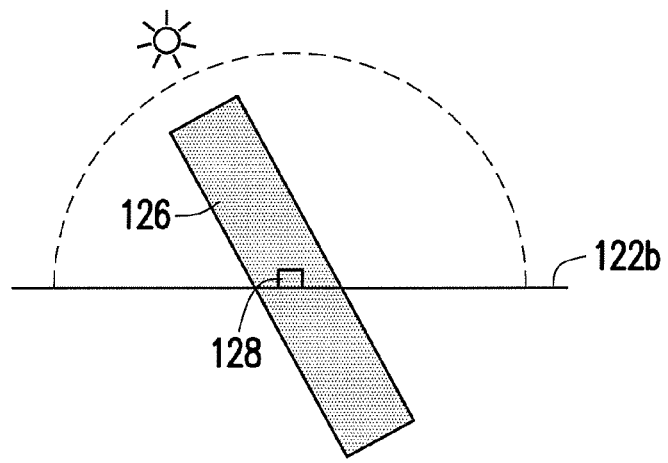
Figure 4C:
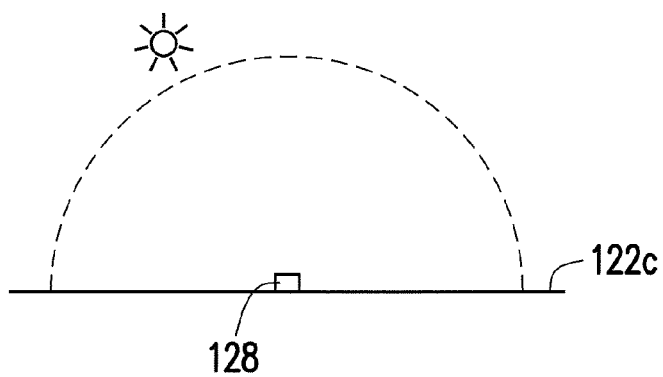

FIGS. 4A-4C schematically illustrate environmental conditions corresponding to FIG. 3 according to an embodiment of the invention. Specifically, FIG. 4A correspondingly illustrates the environmental conditions on which the digital camera 124 shown in FIG. 3A is employed. The sky dome is depicted by dotted lines. The sun is in the sky dome. In the present embodiment, the light-shading device 126 is the light-shading ring, for instance, and the light-shading ring blocks the direct sun light along the arc-shaped trajectory of the sun. As shown by the right-hand subfigure in FIG. 4A, the image 200 of the sky dome has the shadow 202 corresponding to the light-shading device 126. FIG. 4B correspondingly illustrates the environmental conditions on which the pyranometer 128 shown in FIG. 3B is employed. The sun is also blocked by the light-shading device 126. FIG. 4C correspondingly illustrates the environmental conditions on which the pyranometer 128 shown in FIG. 3C is employed, and the sun is not blocked herein.

Figure 5A:
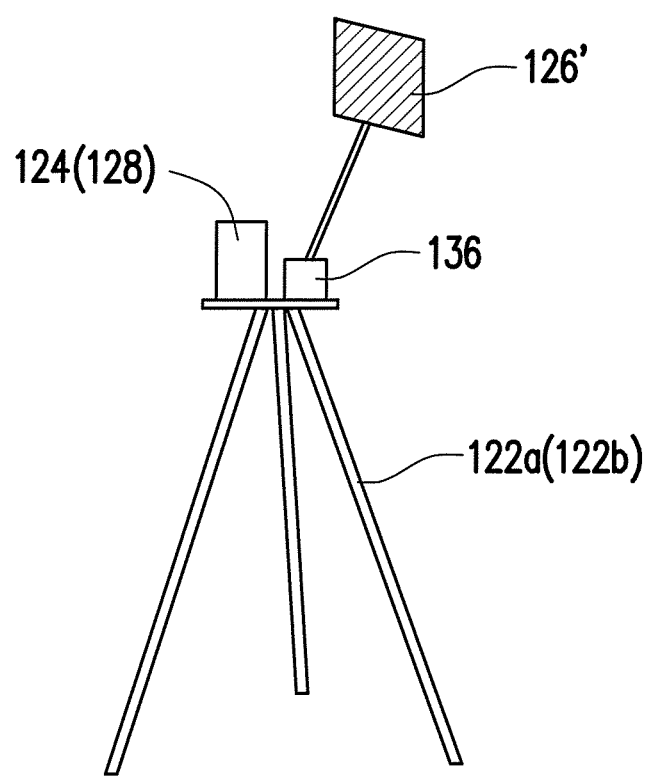
FIG. 5A, FIG. 5B, and FIG. 5C schematically illustrate structures of light-shading devices in a sky luminance mapping system according to an embodiment of the invention.
Figure 5B:
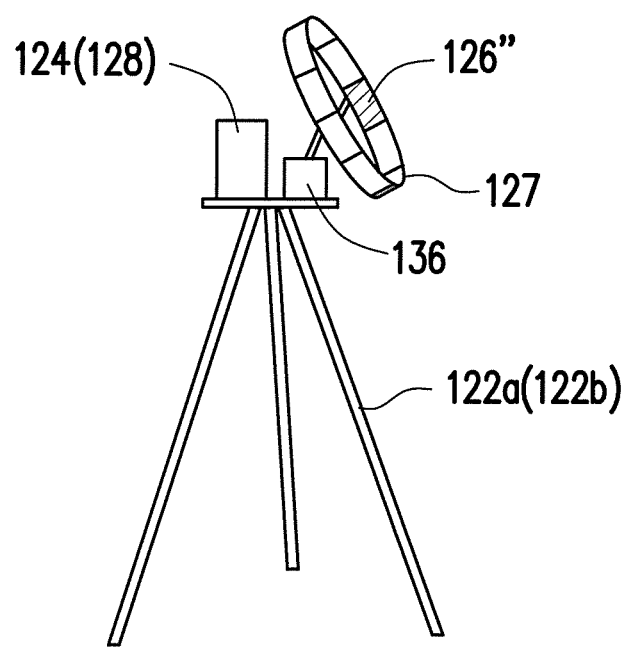
Figure 5C:
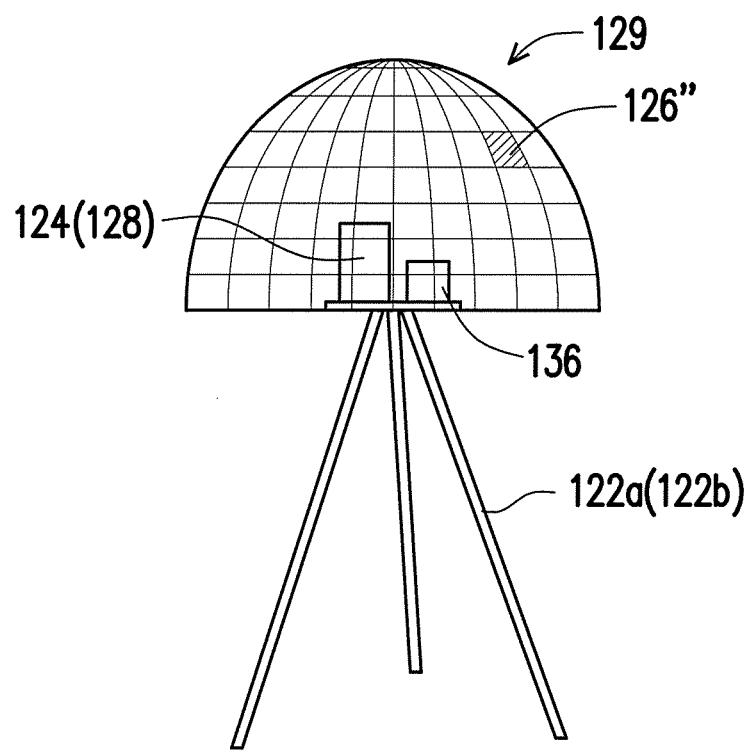

FIGS. 5A-5C schematically illustrate structures of light-shading devices in a sky luminance mapping system according to an embodiment of the invention. With reference to FIG. 5A, the structures shown in FIG. 3A and FIG. 3B can be integrated to form one unit for measuring the luminance of the sky dome. Hence, the digital camera 124 and the pyranometer 128 may be arranged on the same support mechanism 122a or 122b and share the same light-shading device 126'. Here, the light-shading device 126' is a variation of the light-shading ring shown in FIGS. 3A-3C. Since the sun merely occupies one part of the sky dome, the light-shading device 126' is designed as the light-shading sheet. Nevertheless, the sun moves with respect to time, and thus the light-shading sheet need be controlled by one control unit 136 and can be moved with respect to time along the trajectory of the sun. Here, the trajectory of the sun may be deduced from astronomical theories or may be directly measured, which should be construed as limited to the embodiments provided in the invention. Once the instant location of the sun at the instant time is learned, the sheet-like light-shading device 126' can be applied to block the direct sun light, and the shaded area can be moved together with time.

The light-shading sheet may be designed in another manner. For instance, in FIG. 5B, a plurality of light-shading sheets 126", made of electronic glass material as an example, can be used to form a ring 127. The light transmittance of each light-shading sheet 126" with the electronic glass material can be individually controlled to determine whether the light-shading sheet is transparent or not. As to the structural design, plural light-shading sheets form as the ring 127, and the selected light-shading sheet 126", indicated by the hatched one, corresponding to the direct sun light at the instant time may be individually controlled as being non-transparent with respect to the location of the moving sun in timing. As such, the area shaded by the light-shading sheets can be moved together with time.

Further in another embodiment as shown in FIG. 5C, multiple light-shading sheets 126" can also form as a dome 129 instead of ring 127 in FIG. 5B. In this situation, the control to the light-shading sheets 126" is the same but it can be more free and better effect to block the direct sunlight, in which one or several light-shading sheets 126" are selected as a local region to be set to the non-transparent state depending on the actual need.

Figure 6:
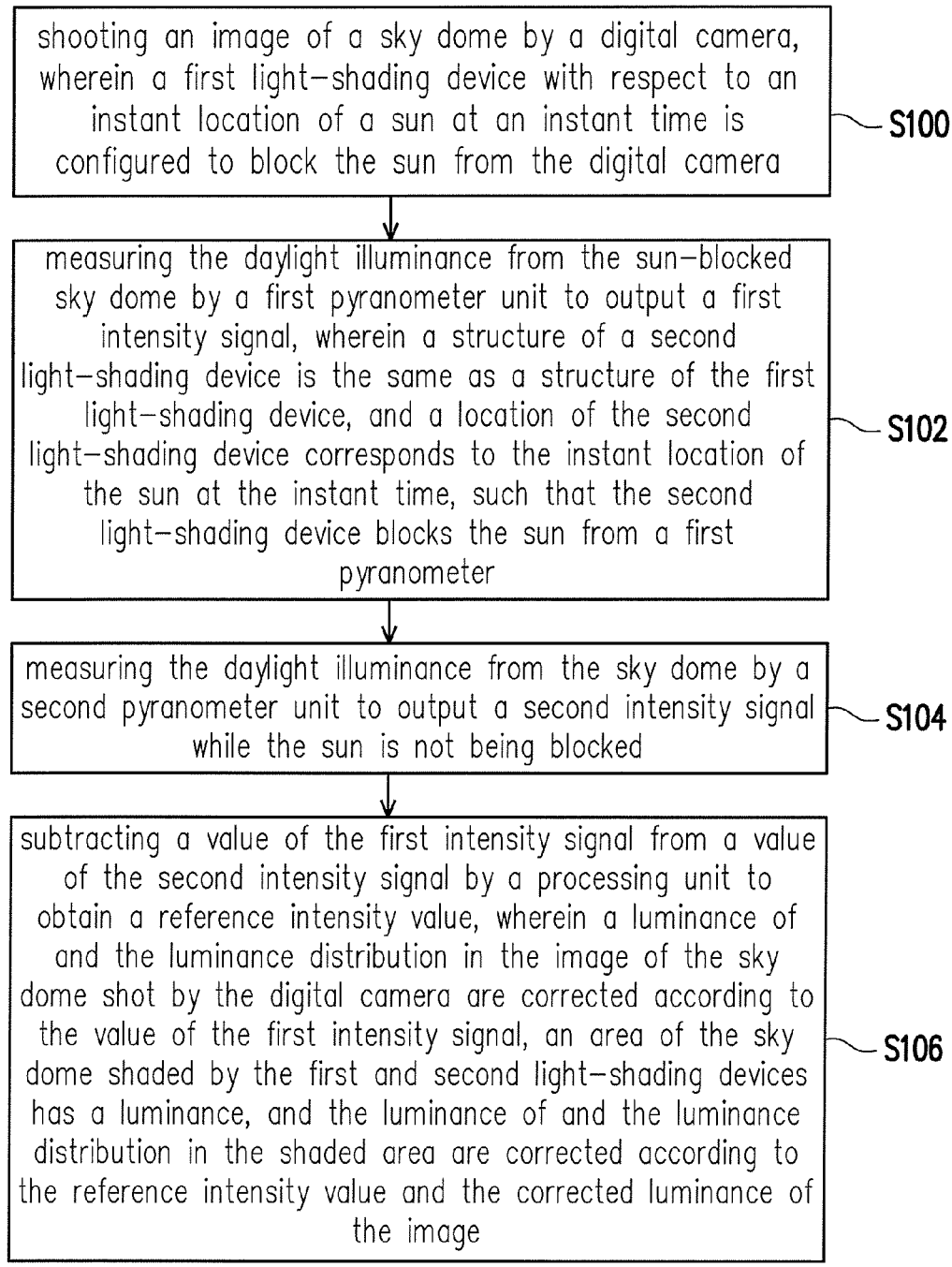
FIG. 6 schematically illustrates a sky luminance mapping method according to an embodiment of the invention.

In an embodiment of the invention, a sky luminance mapping method is also provided. FIG. 6 schematically illustrates a sky luminance mapping method according to an embodiment of the invention. As shown in FIG. 6, the sky luminance mapping method includes step S100, i.e., shooting an image of a sky dome by a digital camera, wherein a first light-shading device corresponding to an instant location of a sun at an instant time is configured to block the sun from the digital camera. In step S102, the daylight illuminance from the sun-blocked sky dome is measured by a first pyranometer unit to output a first intensity signal, wherein a structure of a second light-shading device is the same as a structure of the first light-shading device, and a location of the second light-shading device corresponds to the instant location of the sun at the instant time, such that the second light-shading device blocks the sun from a first pyranometer. A second support mechanism and the second light-shading device corresponding to a first support mechanism and the first light-shading device are separately arranged. Alternatively, the second support mechanism and the second light-shading device can be common devices used as the first support mechanism and the first light-shading device. In step S104, the daylight illuminance from the sky dome is measured by a second pyranometer unit to output a second intensity signal while the sun is not being blocked. In step S106, a value of the first intensity signal is subtracted from a value of the second intensity signal by a processing unit to obtain a reference intensity value. Here, the luminance of and the luminance distribution in the image of the sky dome shot by the digital camera are corrected according to the value of the first intensity signal. An area of the sky dome shaded by the light-shading device has a luminance, and the luminance of and the luminance distribution in the shaded area are corrected according to the reference intensity value and the corrected luminance of the image.

The arrangement of the light-shading rings and the pyranometers allows the separate measurement of the direct sun light and the sky light; during the measurement, components in the sky luminance mapping system need not be replaced manually because of the HDRi technology, and thereby the HDRi performance can be enhanced. In addition, the data updating frequency can also be improved, e.g., the sky luminance mapping system can be operated outdoor continuously for several hours. The digital camera may be equipped with the circular fisheye lens as the sky dome monitor camera, such that the data can be updated once in every minute, for instance.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A sky luminance mapping system comprising:
a camera unit comprising:
   a first support mechanism;
   a digital camera arranged on the first support mechanism, the digital camera having a fisheye lens to shoot an image of a sky dome; and
   a first light-shading device arranged on the first support mechanism, a location of the first light-shading device corresponding to an instant location of a sun at an instant time, such that the first light-shading device blocks the sun from the digital camera;
a first pyranometer unit comprising:
   a second support mechanism;
   a first pyranometer arranged on the second support mechanism, the first pyranometer measuring the daylight illuminance from the sky dome to output a first intensity signal; and
   a second light-shading device arranged on the second support mechanism, a structure of the second light-shading device being the same as a structure of the first light-shading device, a location of the second light-shading device corresponding to the instant location of the sun at the instant time, such that the second light-shading device blocks the sun from the first pyranometer, wherein the second support mechanism and the second light-shading device corresponding to the first support mechanism and the first light-shading device are separately arranged, or the second support mechanism and the second light-shading device are common devices used as the first support mechanism and the first light-shading device;
a second pyranometer unit comprising:
   a third support mechanism; and
   a second pyranometer arranged on the third support mechanism, the second pyranometer measuring the daylight illuminance from the sky dome to output a second intensity signal while the sun is not being blocked; and
a processing unit, receiving the first intensity signal output by the first pyranometer, the second intensity signal output by the second pyranometer, and the image of the sky dome shot by the digital camera, wherein a reference intensity value is obtained by subtracting a value of the first intensity signal from a value of the second intensity signal, and a total luminance of and the luminance distribution in the image of the sky dome are corrected according to the value of the first intensity signal and the reference intensity value.

2. The sky luminance mapping system of claim 1, wherein the first light-shading device and the second light-shading device are light-shading rings, and a ring surface of each of the light-shading rings corresponds to a trajectory plane of the sun, so as to block the sun from the digital camera and the first pyranometer.

3. The sky luminance mapping system of claim 1, wherein the first light-shading device and the second light-shading device are light-shading domes, and a local region of a dome surface of each of the light-shading domes corresponds to the sun is controlled to block the sun from the digital camera and the first pyranometer.

4. The sky luminance mapping system of claim 1, wherein the luminance distribution in the image of the sky dome is corrected according to the reference intensity value by adding a luminance of a direct sunlight at the instant location to a corrected luminance and the corrected luminance distribution of the image of the sky dome according to the first intensity signal.

5. The sky luminance mapping system of claim 1, wherein the first light-shading device and the second light-shading device are light-shading sheets, and an area shaded by the light-shading sheets is moved together with time by a control mechanism according to a trajectory of the sun.

6. The sky luminance mapping system of claim 1, wherein the digital camera is a high dynamic range imaging camera.

7. A sky luminance mapping method comprising:
shooting an image of a sky dome by a digital camera, wherein a first light-shading device with respect to an instant location of a sun at an instant time is configured to block the sun from the digital camera;
measuring a daylight illuminance from the sky dome by a first pyranometer unit to output a first intensity signal, wherein a structure of a second light-shading device is the same as a structure of the first light-shading device, and a location of the second light-shading device corresponds to the instant location of the sun at the instant time, such that the second light-shading device blocks the sun from a first pyranometer, wherein a second support mechanism and the second light-shading device corresponding to a first support mechanism and the first light-shading device are separately arranged, or the second support mechanism and the second light-shading device are common devices used as the first support mechanism and the first light-shading device;
measuring a daylight illuminance from the sky dome by a second pyranometer unit to output a second intensity signal while the sun is not being blocked; and
subtracting a value of the first intensity signal from a value of the second intensity signal by a processing unit to obtain a reference intensity value, wherein a total luminance of and the luminance distribution in the image of the sky dome shot by the digital camera are corrected according to the value of the first intensity signal, an area of the sky dome shaded by the first light-shading devices has a luminance, and the luminance distribution of the shaded area is corrected according to the reference intensity value and the corrected luminance distribution of the image.

8. The sky luminance mapping method of claim 7, wherein the first light-shading device and the second light-shading device are light-shading rings, and a ring surface of each of the light-shading rings corresponds to a trajectory plane of the sun, so as to block the sun from the digital camera and the first pyranometer.

9. The sky luminance mapping method of claim 7, wherein the first light-shading device and the second light-shading device are light-shading domes, and a local region of a dome surface of each of the light-shading domes corresponds to the sun is controlled to block the sun from the digital camera and the first pyranometer.

10. The sky luminance mapping method of claim 7, wherein the luminance of the image of the sky dome is corrected according to the reference intensity value by adding a luminance of a direct sunlight to a corrected luminance of the image of the sky dome according to the first intensity signal.

11. The sky luminance mapping method of claim 7, wherein the first light-shading device and the second light-shading device are light-shading sheets, and the area shaded by the light-shading sheets is moved together with time by a control mechanism according to a trajectory of the sun.

12. The sky luminance mapping method of claim 7, wherein the digital camera is a high dynamic range imaging camera.

* * * * *